(12) United States Patent
Hamann et al.

(10) Patent No.: US 6,702,186 B1
(45) Date of Patent: *Mar. 9, 2004

(54) ASSEMBLY COMPRISING A PLURALITY OF MEDIA PROBES FOR WRITING/READING HIGH DENSITY MAGNETIC DATA

(75) Inventors: Hendrik F. Hamann, Mohegan Lake, NY (US); Yves Martin, Ossining, NY (US); Hemantha Kumar Wickramasinghe, Chappaqua, NY (US)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 09/512,248

(22) Filed: Feb. 24, 2000

(51) Int. Cl.$^7$ ............................................... G06K 19/06
(52) U.S. Cl. ...................... 235/493; 360/59; 369/13.62; 219/540; 235/449
(58) Field of Search ........................ 360/59; 369/13.02; 219/540; 235/439, 440, 450, 449

(56) References Cited

U.S. PATENT DOCUMENTS

| | | | | |
|---|---|---|---|---|
| 4,747,698 A | * | 5/1988 | Wickramasinghe et al. | 374/6 |
| 5,008,765 A | * | 4/1991 | Youngquist | 360/77.12 |
| 5,054,936 A | * | 10/1991 | Fraden | 374/164 |
| 5,193,039 A | * | 3/1993 | Smith et al. | 360/321 |
| 5,274,507 A | * | 12/1993 | Lee | 360/39 |
| 5,412,597 A | * | 5/1995 | Miyazaki et al. | 369/126 |
| 5,481,527 A | * | 1/1996 | Kasanuki et al. | 369/126 |
| 5,602,820 A | * | 2/1997 | Wickramasinghe et al. | 369/126 |
| 5,986,978 A | * | 11/1999 | Rottmayer et al. | 369/13.17 |
| 6,052,249 A | * | 4/2000 | Abraham et al. | 360/59 |
| 6,233,206 B1 | * | 5/2001 | Hamann et al. | 369/13.01 |
| 6,405,277 B1 | * | 6/2002 | Jen et al. | 360/75 |

* cited by examiner

*Primary Examiner*—Andrew L. Sniezek
*Assistant Examiner*—Rocio Colon
(74) *Attorney, Agent, or Firm*—Stephen C. Kaufman; Thomas R. Berthold

(57) ABSTRACT

The invention discloses in one embodiment a parallel probe array (N×M) incorporating thermal near-field heaters (or writers) as well as magnetic sensors (or readers), which can be moved en bloc as well as independently of each other. To this end, the present invention uses a suitable controlling electronics for coordinating a parallel or quasi-parallel reading/writing, as well as controlling the positioning of an individual probe in an array. The control electronics enables the addressing of an individual or preselected set of probes, for controlling reading and/or writing, thereby securing the considerable advantage of versatility and efficiency of reading/writing in a parallel operation mode.

21 Claims, 8 Drawing Sheets

ASSEMBLY COMPRISING A PLURALITY OF MEDIA PROBES FOR WRITING/READING HIGH DENSITY MAGNETIC DATA

CROSS-REFERENCE TO RELATED APPLICATIONS

The instant application is related to U.S. application Ser. No. 09/408,946 filed Sep. 30, 1999 by Wickramasinghe et al, and to U.S. application Ser. No. 09/427,169 filed Oct. 26, 1999 by Hamann et al, which applications are co-pending, commonly assigned, and incorporated by reference herein.

INTRODUCTION TO THE INVENTION

The instant invention builds upon concepts disclosed in the cross-referenced applications. In particular, a centerpiece of the second of the two cross-referenced applications is the promulgation of a novel assembly for writing/reading high-density data on a recording media as a series of tags comprising a magnetic information bit pattern, the assembly comprising:

1) a magnetic bias field generator for applying a magnetic bias field on the media;
2) a thermal heater for generating and directing an incident thermal wave to the media;
3) a first controller for coordinating a mutual positioning of the incident thermal wave and the media for inducing a direct thermal coupling therebetween;
4) a magnetic sensor capable of reading written data on the media; and
5) a second controller for coordinating a mutual positioning of the magnetic sensor and the media; the assembly acting as a reader by operating the second controller; the assembly acting as a writer by operating the first controller and realizing at least one of the following actions:
   i) using an information signal for modulating the magnetic bias field;
   ii) using an information signal for modulating the power of the incident thermal wave to the media.

This assembly is an important contribution to the art.

First of all, this writer/reader can realize a dual and independent capability or functionality, namely, a writer and/or a reader, and this, either sequentially or simultaneously.

Second this writer/reader can provide a simple and complete solution for testing magnetic recording, for example (and most profoundly), on the nanometer scale. To restate this last critical advantage—we know of no present technology, with particular reference to hard magnetic materials, which can enable the study of their properties on a nanometer scale.

SUMMARY OF THE INVENTION

In the present invention, we build upon the just defined assembly for writing/reading, by fully preserving and exploiting its many advantages, while adding to it a capability for parallel thermal recording and/or parallel magnetic sensing output or reading, as well as a capability for quasi-parallel thermal recording and/or quasi-parallel magnetic sensing output or reading.

Accordingly, the present invention comprises an assembly for parallel writing/reading high density data on a recording media comprising a magnetic information bit pattern, the assembly including:

1) a plurality of media probes wherein each probe is selected from the group consisting of a thermal heater for generating and directing an incident thermal wave to the media for enabling reading and/or writing, and, a magnetic sensor for enabling reading and/or writing;
2) a magnetic bias field generator for applying a magnetic bias field on the media;
3) a position controller for coordinating a mutual positioning of an enabled probe and the media for inducing a direct thermal coupling therebetween;
4) a control electronics for:
   (i) addressing a media probe for enabling and coordinating its reading and/or writing; and
   (ii) coordinating parallel or quasi-parallel reading and/or writing with an array of media probes by instruction to the position controller;
   the assembly acting as a writer by realizing at least one of the following actions per media probe:
   a) using an information signal for modulating the magnetic bias field;
   b) using an information signal for modulating the power of an incident thermal wave to the media;
   the assembly acting as a reader by operating the position controller vis a vis a preselected media probe.

The high degree of parallelism that may be obtained by way of the present invention enables one to secure high data rates and densities, for example, densities greater than 100 $Gbit/in^2$ accompanied with data rates of greater than 0.1 Gbit/s.

In overview, the present invention in one embodiment preferably comprises a parallel probe array (N×M) incorporating thermal near-field heaters (or writers) as well as magnetic sensor (as readers), which can be moved en bloc as well as independently of each other. To this end, the present invention uses a suitable controlling electronics for coordinating a parallel or quasi-parallel reading/writing, as well as controlling the positioning of an individual probe in an array. The control electronics enables the addressing of an individual or preselected set of probes, for controlling reading and/or writing, thereby securing the considerable advantage of versatility and efficiency of reading/writing in a parallel operation mode.

DESCRIPTION OF THE DRAWINGS

The invention is illustrated in the accompanying drawing (not drawn to scale), in which.

DETAILED DESCRIPTION OF THE INVENTION

The detailed description of the invention includes two major sections. The first section, a prefatory section, discloses canonical and disparate structural elements and functionalities, of a single stage assembly comprising a single media probe. The prefatory section is presented for ease of pedagogy and instruction and as prelude to the second section disclosing a multi-stage assembly comprising a plurality of media probes. The second section calls upon disclosure in the first section, and it will be apparent to those skilled in the art that the material in the first section is applicable to the second section, mutatis mutandis.

Section I

A Single Stage Assembly

Overview of Assembly

Figure 1:
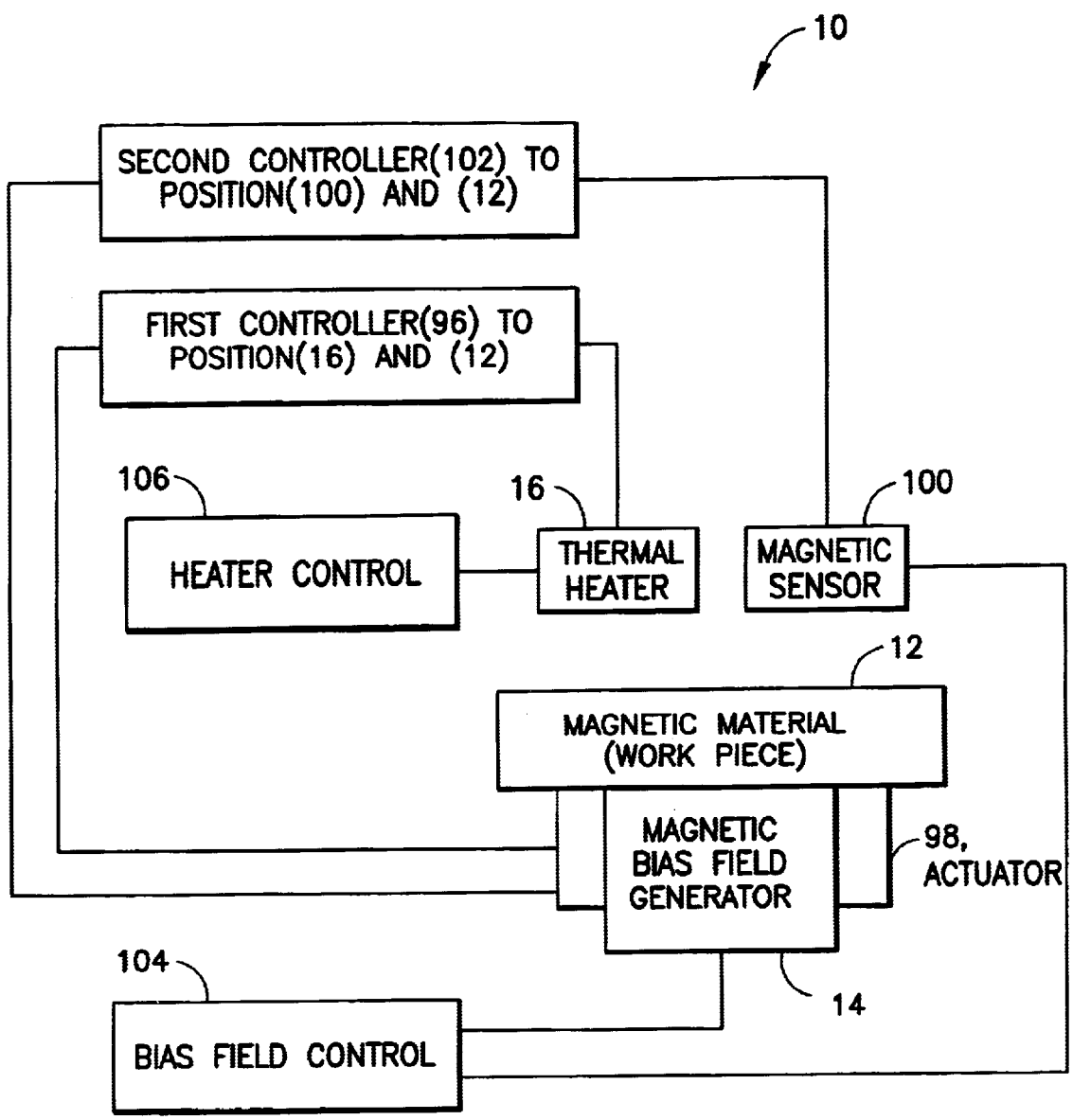
FIG. 1 shows a generalized assembly that illustrates canonical aspects of the present invention.

FIG. 1 shows a generalized single stage assembly (10).

In overview, the FIG. 1 assembly (10) can function to write and/or read high density data on a digital recording media (12), for example, a media (12) comprising TbFe, Co/Pt multilayer, FeCoCr etc.

Magnetic Bias Field Generator

The FIG. 1 assembly (10) requires a magnetic bias field generator (14) for applying a magnetic bias field on the media (12). A particular media (12) mediates whether there is a horizontal or a vertical magnetic bias field. The field generator (14) may be selected from the group consisting of at least one of an electromagnet and a permanent magnet. The permanent magnet generally has a stronger field than the electromagnet, and may therefore help obviate deleterious heating effects that may be induced by the electromagnet. The magnetic field generator (14) can apply a local field, or a global field, or a pulsed field; in some specific cases, no bias field at all is needed. Note that the field generator (14) can assist in writing as well as maintaining or stabilizing the magnetic spins of surrounding media material.

Thermal Heater

The FIG. 1 assembly (10) requires a thermal heater (16) for generating and directing an incident thermal wave to the media (12). To this end, the assembly (10) may employ a thermal near-field heater, or an atomic force microscope probe (AFM), utilizing an AFM's cantilever as a heating plate and heat sink (see details, below). Alternatively, the thermal heater may comprise a magnetic force microscope (see below). We now discuss these three devices, in turn.

Near-Field Thermal Heater

A suitable near-field thermal heater may comprise two elements: a heating plate that can operate as a heat source; and, a heat sink attached to the heating plate; the heater capable of developing a thermal near-field coupling with the thermo-magnetic media (12).

Attention is now directed to FIGS. 2A–D, which help illustrate the many different geometrical, dimensional, and material configurations which may be suitably adapted for a particular realization of a novel thermal near-field heater.

In overview of the FIGS. 2A–D thermal near-field heaters, it is noted that their purpose is to deposit heat energy to the thermal-magnetic media (12). This energy can be almost any kind; e.g., coherent or non-coherent excitons, plasmons, phonons, photons, etc., and it can be delivered in any mode, e.g., as convective, radiative, or conductive transfer. For example, it can be delivered in any mode from the heat source to the media (12). The heat transfer (see J. B. Xu, K. Läuger, R. Möller, K. Dransfeld, I. H. Wilsom, J. Appl. Phys. 76, 7209 (1994)) is generally diffusive, if the mean free path of molecules $\lambda$ is much less than the distance of the heater to media d. However, if the d<$\lambda$, the molecules in the junction go from the heater to the media without collisions, and transfer the heat in a ballistic manner. In addition, heat can be transferred via propagating radiation according to the Stefan-Boltzmann law. Furthermore, non-propagating waves (near-field) are capable for transferring the heat via a tunneling process when heater and media are very close to each other (near-field region).

Good geometrical conductors for our thermal near-field heater include rectangular or cylindrical design, of the type shown in FIGS. 2, A, B, respectively (numerals 18–28).

For example, the preferred dimensions of $y_1$ and $z_1$ (FIG. 2A) or $r_1$ (FIG. 2B) are informed by the way the thermal energy is to be deposited. For instance, if one uses a focused laser beam to heat up the heating plates (20, 26), $y_1$ and $z_1$ or $r_1$ preferably are larger than the waist of the laser focus (e.g., for a numerical aperture of 0.8 $y_1$, $z_1$, $r_1$>0.8 micrometer). If, on the other hand, one uses a wave-guided laser beam, then the heating plate (20,26), preferably is attached right onto the end of a fiber (maybe via vapor deposition). Therefore, the heating plate (26) preferably has a cylindrical shape, and $r_1$ is determined by the wave-guide size. More specifically, for a single mode fiber in the visible wavelength range, $r_1$ preferably is approximately 3–4 micrometer. If one uses tapered fiber, $r_1$ preferably is larger than or equal $\lambda/2$, where $\lambda$ is the wavelength of the utilized laser light. If, alternatively, one uses resistive heating, then one chooses, most likely, a rectangular shape, and the dimensions are preferably dominated by the connections and the resulting resistance.

In the case of resistive heating, these dimensions can be rather small ($y_1$, $z_1$<0.1 micrometer) if they are made via e-beam lithography. We note that in the case of resistive heating, the dimensions as well as the material determine the actual resistance, and hence the heating.

While the $y_1$, $z_1$, $r_1$ dimensions are determined mostly by practical needs, the thickness of the heating plate (20,26) itself should be rather small ($d_1, x_1 21$ 0.5 micremeter), for example, if the device is to be used for high speed recording. More specifically, in high speed applications, one preferably uses energy pulses to deposit the heat in the heating plate, so as to subsequently heat up the near-field heat source, e.g., a tip or an edge of the heating plate.

In order to heat up again, the deposited heat (from a last pulse), has to be dissipated. This dissipation is governed by the thermal diffusion length $l=(\kappa \cdot \tau)^{0.5}$, where $\kappa$ is the thermal diffusivity and $\tau$ is the time after the arrival of a heat pulse. Specifically, the heat in a good thermal conductor (approximately $\kappa=2 \cdot 10^{-5} m^2 s^{-1}$) can diffuse a distance of 0.45 micrometer in only 10 ns, corresponding to recording rates of 100 MHz. If one uses a laser beam to deposit the heat, it is noted that the heating plate (20,26) preferably should be at least of the thickness of the skin depth at the laser frequency. Specifically, for a very high absorbing material (e.g., Al) it preferably is larger than 10 nm at 633 nm.

The heating plate (20,26) can be made out of any material, but in general the following requirements preferably exist. (1) The material preferably has a high melting point (T>1100K), generally higher than the temperature, which is necessary for the recording. (2) It preferably has a high thermal diffusivity ($\kappa>1 \cdot 10^{-5}$ $m^2$ $s^{-1}$, e.g., metals and alloys). (3) The material preferably is high absorbing if a laser is used for the heating (e.g., Cr, Al).

Figure 2A:
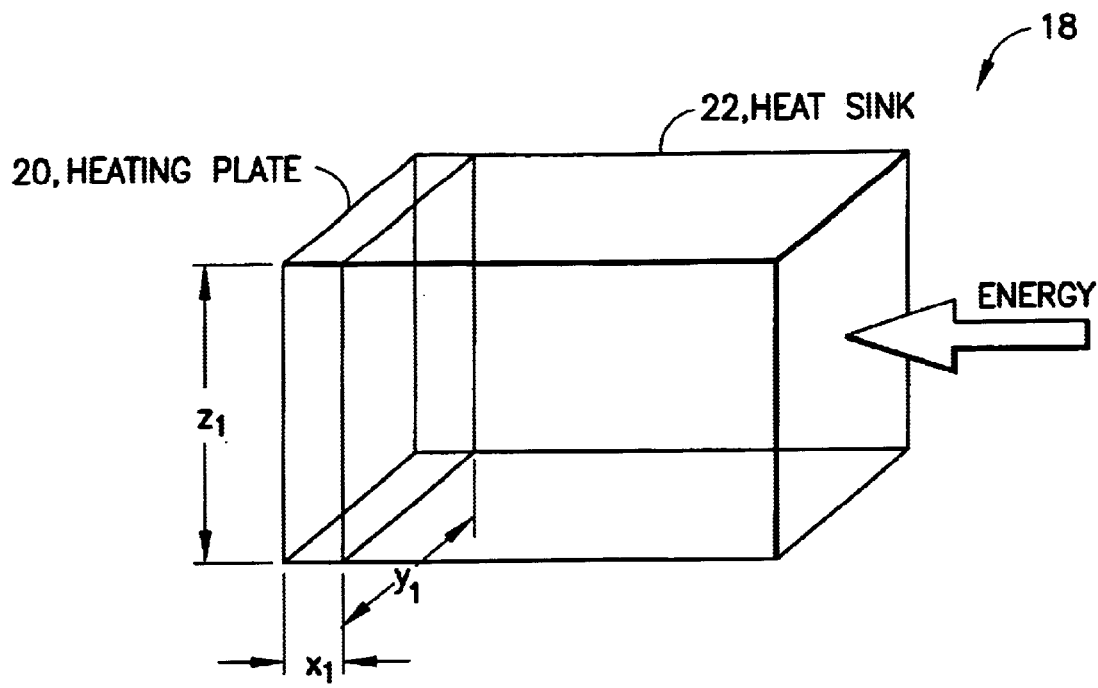
FIGS. 2A–D show alternative embodiments of a near-field thermal heater, with emphasis on its heating plate which can act as a heat source, that may be employed in the FIG. 1 assembly.
Figure 2B:
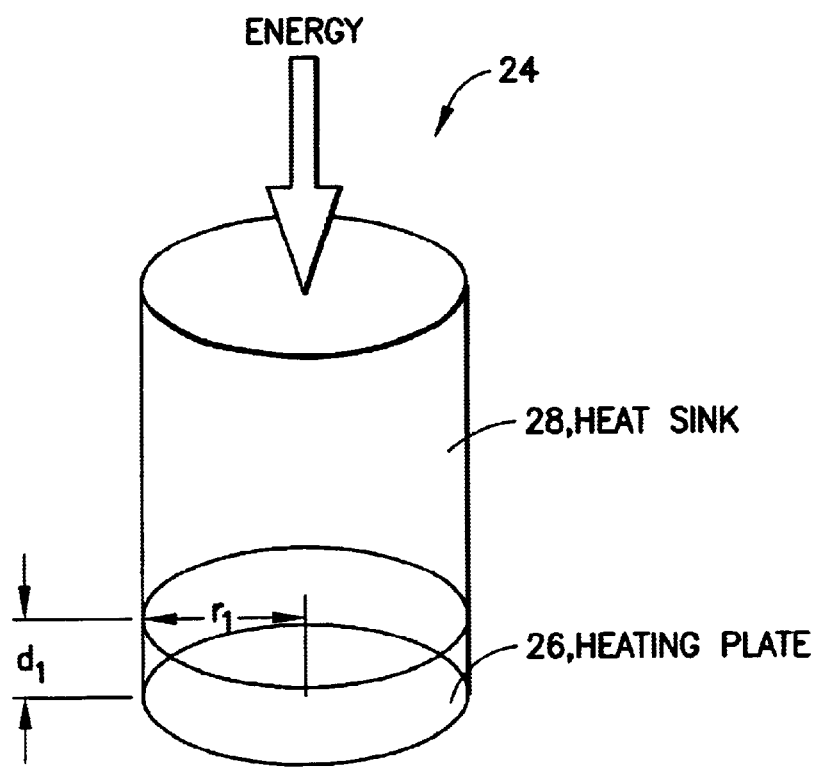
Figure 2C:
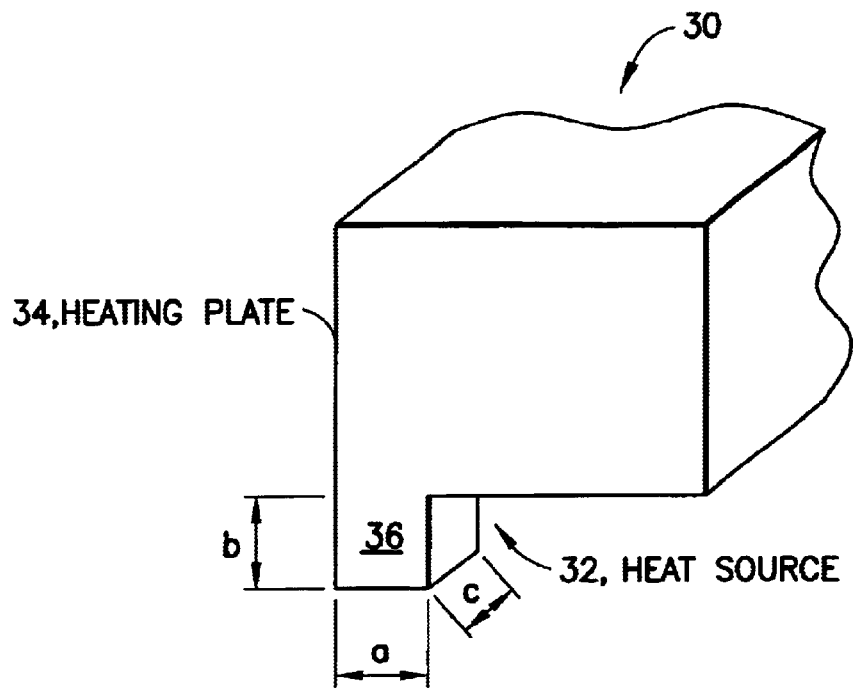
Figure 2D:
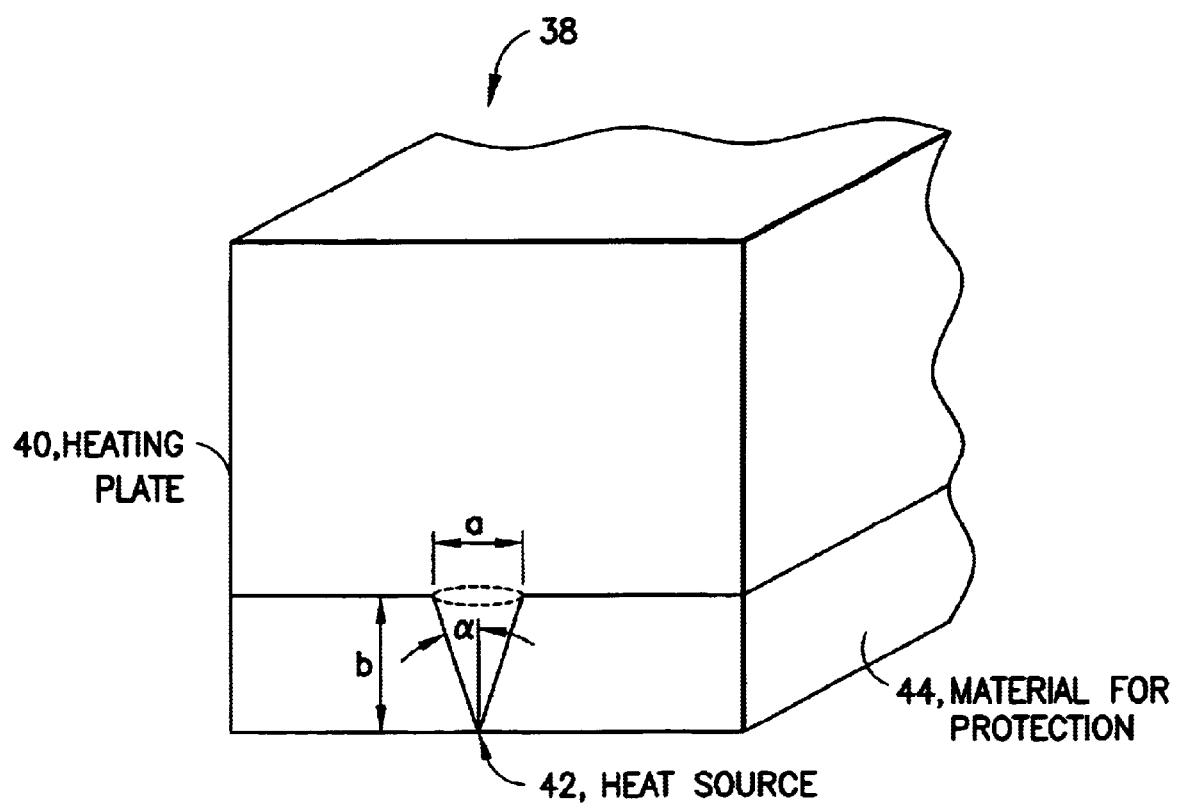

As explained above, a generic purpose of the heat plate operating as a heat source is to guide the thermal energy to the thermo-magnetic media (12). It should be noted that the heating plate is generally hot, and hence generally capable of heating the media. However, such general heating may not always be optimal, since the dimensions of the heating plate may be large, resulting in a large bit. One purpose of the heat source, accordingly, may be to avoid general heating from the heating plate, and to instead focus the thermal energy to a very small point. An attendant and novel property is then to generate a thermal near-field, which can interact very locally, preferably on a nanometer scale, with the media. To this end, the heating plate operating as a heat source can have all kinds of shapes and dimensions. For example, the heat source may be just an edge (36) of a heating plate (34) (FIG. 2C), or a truncated cone (42) of a heating plate (40) (FIG. 2D). Sometimes, the heat source may be usefully protected by some low heat conducting material (44) (e.g., glass).

Overall, the shape and dimensions of the heating plate operating as a heat source are influenced by the following requirements. (1) For high speed application, a designer preferably chooses shape and dimensions which transfer the heat as fast as possible. In general, that means that a heat source preferably should have a small length b (e.g., b<0.5 micrometer), in order to achieve sufficient heat dissipation within its thermal diffusion length. If one just considers high speed applications, one may be tempted to choose large dimensions of a, c (FIG. 2C) and a, α (FIG. 2D) in order to avoid a slow one-dimensional heat conduction. (2) However, besides high speed, a heat source preferably provides a very local heating, avoiding any stray heat from the heating plate, generally. Accordingly, this correlates with opposite requirements for the dimensions. For a very local heating, preferably choose b large (>0.1 micrometer), and the dimensions a,c small (<0.01 micrometer) (FIG. 2C) as well as a small a and α (a<0.1 micrometer ,α<15°, FIG. 2D). We note increasing power loss with decreasing dimensions in a,c (FIG. 2C) and a,α (FIG. 2D), which may result in insufficient and very ineffective heating. (3) The shape and dimensions of the heat source are preferably matched to a bit size and a bit pattern. In general, the bits are typically larger or equal to the dimensions of a heat source. Specifically, for a 20 nm bit, preferably work with a heat source of the dimensions a,c <<20 nm (FIG. 2C).

The material of the heating plate can be almost any kind. We note that an edge or tip material is preferably governed by the same general material requirements as that of the heating plate, proper.

We recall from above that our preferred thermal near-field heater includes a second element, namely, a heat sink attached to the heating plate. We now turn our particular attention to this second element.

Figure 3A:
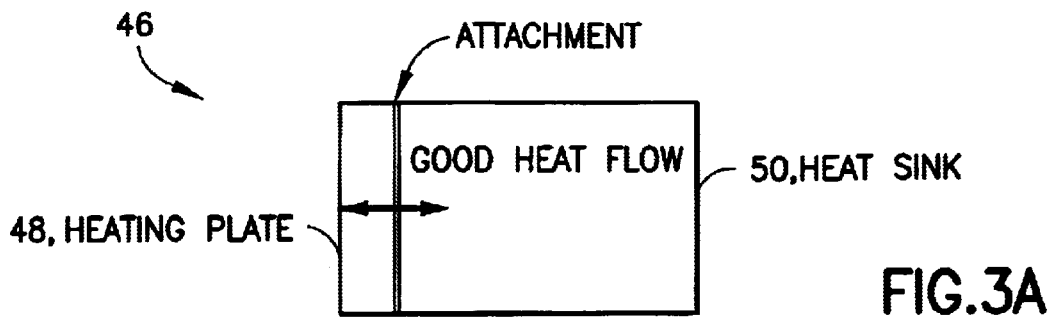
FIGS. 3A–C show alternative embodiments of the FIG. 2 near-field thermal heater, with emphasis on its heat sink.

An important purpose of the heat sink is to dissipate deposited heat as fast as possible, in order to get ready for a new heating pulse. Therefore, the heat sink is preferably attached to the heating plate (FIG. 3A, numerals 46–50). This attachment preferably is made in such a way that the heat conduction between heat sink and heating plate is as good as possible ($\kappa > 1 \cdot 10^{-5}$ m$^2$ s$^{-1}$). Therefore, it may be very advantageous if the heat sink and the heating plate are made out of the same piece of material. In other cases, the heat sink may be welded, glued, or deposited (via e-beam, vapor, sputtering etc.) right on the heating plate.

Figure 3B:
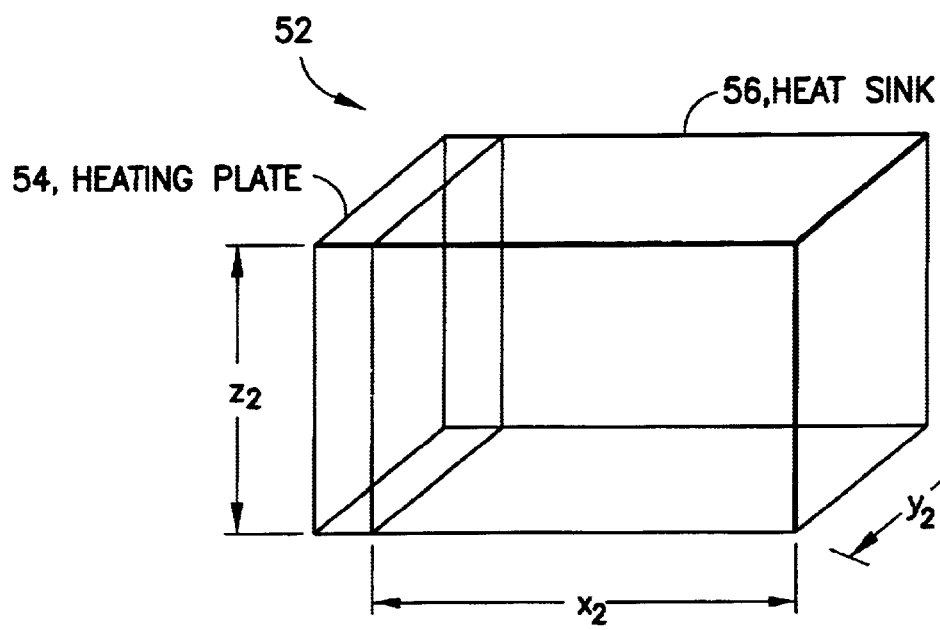
Figure 3C:
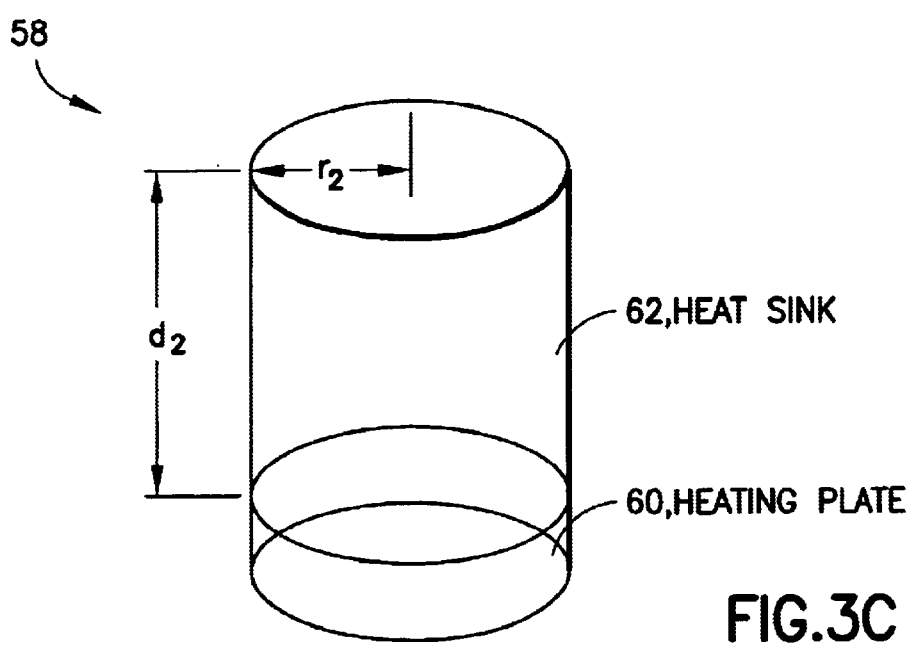

Dimensions and shape for the heat sink are not very critical, so that only guidelines can be given here. In general, the heat sink can have all kinds of shapes. However, in typical cases, it may be rectangular or cylindrical (see FIGS. 3B, C, numerals 52–62). To provide a sufficient heat sink mass, the heat sink preferably is as large as possible. Large dimensions (>1 micrometer) Of $y_2$, $z_2$ and $r_2$ may result in a three-dimensional heat flow greatly enhancing the speed for heat dissipation. The dimensions and the shape of the heat sink do not have to necessarily match the dimensions of the attached heating plate. However, in general the heat sink preferably has dimensions larger or equal to the heating plate (e.g., $y_2 \geq y_1$, $z_2 \geq z_1$, $r_2 \geq r_1$). In terms of the thickness of the heat sink, we note that $d_2$ and $x_2$ should preferably be at least the thermal diffusion length l for a given heating repetition rate 1/t. The material of the heat source can be almost any kind. In analogy to the heating plate and the heat tip or edge, the material of the heat sink preferably has a high melting point as well as a high heat conductivity. However, in some cases the material should not be high absorbing at the laser wavelength, if the laser has to be focused on the heating plate through the heat sink material. In such case, preferably use a transparent material, which is still a good heat conductor and has a high melting point (e.g., diamond).

The Thermal Near-Field

It is asserted above that the invention advantageously uses the idea of direct thermal coupling between a heater and a magnetic thin film media, and, that this coupling can subsume far-field and/or near-field effects. In particular, near-field effects may include a continuum that may extend from coupling that subsumes at least one portion of the thermal near-field; ranging e.g., from partially inclusive, to substantially or even complete coupling in the thermal near-field. We now provide a working definition, for the purposes of a utility of this invention, of the thermal near-field, a utility of the invention generally captured in the notion that increased storage and speed generally correlate to operation more extensively in the thermal near-field.

Figure 4:
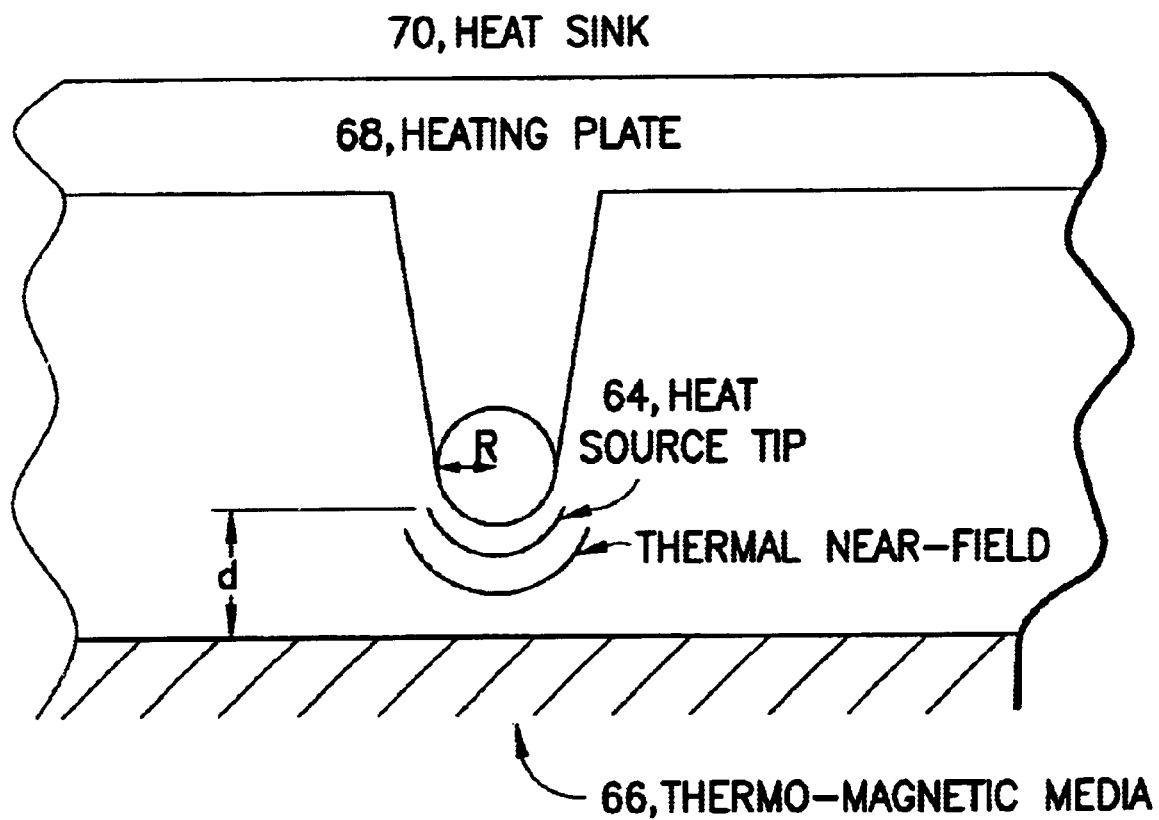
FIG. 4 provides a schematic useful for developing the notion of a near and far-field, as this concept relates to the present invention.

The concept of the thermal near-field is now explained, using an illustrative FIG. 4. Here, a heat source tip (64) interacts via its thermal near-field with a thermo-magnetic media (66). The FIG. 4 heat source tip (64) is spherical at its end with a radius R. For purposes of this invention, the thermal near-field region is the area generally within approximately 2R away from the heat source tip (64). The rest of the area is generally called far-field. We note that in the near-field region, the extent of the thermal energy is generally governed by the heat source tip dimensions. Therefore, if the heat source tip is brought within approximately 2R to the thermo-magnetic media (66), very local, nanoscale heating of the media can be achieved. A heated area is then determined by the heat source dimensions, rather than the energy or wavelength, which is a basic idea of this aspect of the invention.

In this particular application of heat flow, in the far-field the heat is transferred via diffusion as well as via radiation according to the Stefan-Boltzmann law. In the near-field, a ballistic heat flow, where a gas molecule picks up some energy from the heater and transfers it without collisions to the media, as well as heat conduction via non-propagating waves, are important. We also note that contamination layers on the surface may contribute significantly to the near-field and far-field heat flow.

Heat Supply Systems

Figure 5:
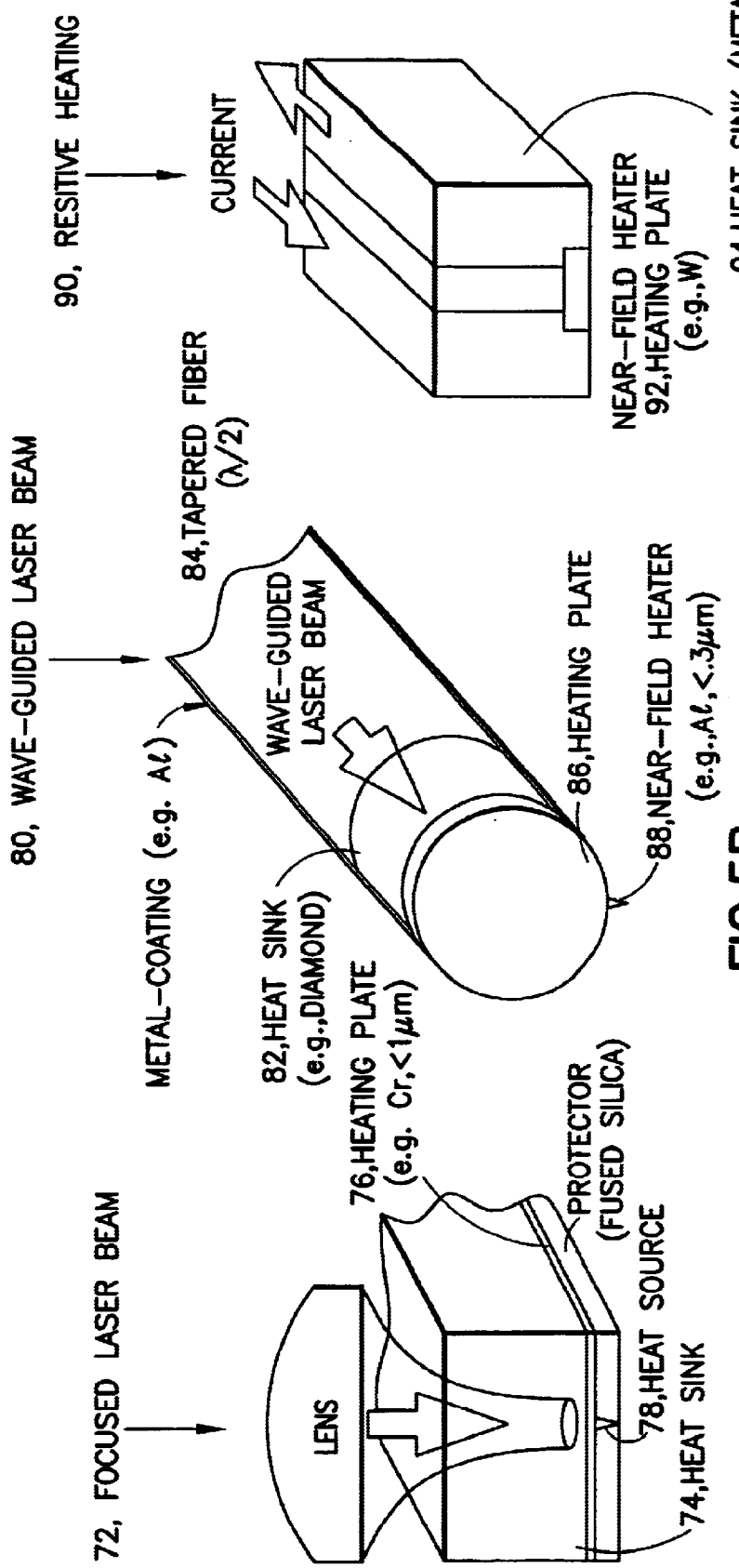
FIGS. 5A–C show illustrative embodiments of mechanisms for depositing thermal energy to a thermal heater.

As mentioned earlier, there may be different ways of supplying the thermal energy; examples are illustrated in FIGS. 5A, B, C.

FIG. 5A shows a focused laser beam embodiment (72), wherein laser light is brought through a heat sink (74) onto a heating plate (76). In this case, we prefer the use of diamond as a heat sink material, which is transparent and has an excellent heat conductivity. An alternative material could be Si, if an infrared laser is used. The heating plate (76) can be very thin (0.1 micrometer) if a high absorbing material is used (e.g., Al, Cr.). Directly attached to the heating plate (76) is a heat tip or feature (78), which preferably is short (<0.3 micrometer). The material of the heat tip or feature (78) can be Cr as well or Al. In these cases, the heat tip or feature preferably is protected with a low heat conducting material, such as glass. Simple estimations about the heat flow suggest that such a device can record data with >100 MHz.

FIG. 5B shows an alternative embodiment comprising a wave-guide laser beam (80) used for the heating. In this embodiment, a heat sink (82), which preferably is made out of diamond, may be directly attached to the end of a fiber (84). In other cases, a metal-coating (e.g., Al) of the wave-guide can be used as the heat sink (82). The wave-guide laser beam is absorbed by a thin (<0.1 micrometer) heating plate (86) directly attached to the fiber or heat sink. Again as a material, Cr or Al may be advantageous, which have generally a small skin depth (<0.02 micrometer). A heat source or tip (88) can be an edge or a little probe attached to the heating plate (86). In such a design, the heat source or tip exemplary has a length <0.3 micrometer.

FIG. 5C shows a further alternative embodiment wherein resistive heating (90) may be used to heat up a heating plate (92). As a heat sink (94), the transmission lines could be used, which may be out of a metal such as Cu. The two transmission lines are separated by a non-conducting material, for example, diamond or even glass. Diamond has an advantage, in that it is a very good heat conductor, and can assist the heat sink (94). The two transmission lines are connected via the heating plate (92), which can act as a heating source. The heating plate (92) can be very small, e.g., (<0.05 micrometer). As a material for heating plate and the heat source, tungsten and/or carbon may be very suitable, because of its resistance and high melting point.

Thermal Heater Comprising An AFM Probe or MFM Probe

As asserted above, the FIG. 1 assembly (10) contemplates that the thermal heater (16) may comprise an atomic force microscope probe (AFM). AFM's are generally discussed in U.S. Pat. No. 4,343,993, incorporated by reference herein. For our purposes, the AFM's cantilever can function as heating plate and heat sink. Thus, a laser focused onto the cantilever (heating plate) can be used to heat up the probe. Also, resistive heating with an AFM probe can be used.

In a similar vein, the thermal heater (16) may comprise a magnetic force microscope (MFM) which is sensitive to a magnetic force between its probe and the media. Instruction on MFM's is provided by U.S. Pat. No. 5,308,937, incorporated by reference herein. An advantage of using the MFM probe as a thermal heater is that a local bias field is provided during the writing process, which may help to write magnetic domains. In this case, we note that it is important that the probe not be heated above its Curie-temperature, which otherwise may destroy the magnetic sensor.

First Controller

The FIG. 1 assembly (10) includes a first controller (96) for coordinating a mutual positioning of the incident thermal wave generated by (16) and the media (12) for inducing a direct thermal coupling therebetween. Preferably, the first controller (96) so functions that the coupling subsumes at least one portion of the thermal near-field. A suitable such first controller preferably uses an actuator (98), which actuator (98) may be selected from the group consisting of a piezo-electric actuator, an electrostatic actuator, an electro-magnetic actuator, a magneto-strictive actuator, and a thermal-mechanical actuator.

Magnetic Sensor

The FIG. 1 assembly (10) includes a magnetic sensor (100) capable of reading data written on the media (12) with high resolution. The magnetic sensor (100) may comprise magnetic-sensitive sensing, or magnetic-force sensing, or magnetic tunneling junction sensing, or near-field optical sensing, or magnetic induction sensing, or magnetic resistive sensing. An important feature of the present invention is that the magnetic sensor (100) may comprise the same type of element as the thermal heater (16); for example, they may each comprise a magnetic force microscope i.e., an MFM probe may be used as the thermal heater (16).

Second Controller

The FIG. 1 assembly (10) includes a second controller (102) for coordinating a mutual positioning of the magnetic sensor (100) and the media (12). A suitable such second controller (102) preferably uses the actuator (96) which actuator (96), may be selected from the group consisting of a piezo-electric actuator, an electrostatic actuator, an electromagnetic actuator, a magneto-strictive actuator, and a thermal-mechanical actuator.

Other Controllers

The FIG. 1 assembly (10) further includes a controller (104) for enabling bias field control, and a controller (106) for enabling thermal heater control.

In order to control the writing of the magnetic bits, the magnetic bias field and/or the thermal heater have to be controlled precisely. For example, the magnetic bias field of an electromagnet can be simply controlled via the current supplied. If a permanent magnet is utilized, an actuator may be used to change the position of magnet and thus to modulate the field supplied to the media. The thermal heating can be controlled by modulating a laser (e.g., liquid crystal, Bragg cell, current modulation etc.) if a laser is used, or by simply modulating the supplied current if resistive heating is implemented. If a pulsed magnetic bias field and pulsed heating are used, then we note, that in general the pulse of the bias field has to be longer than the heating in order to prevent the written information being erased by the heating.

Section II

A Multi-Stage Assembly

As described above, Section II calls upon the material presented in Section I; the Section I material is readily incorporated, mutatis mutandis, into the Section II multi-stage assembly.

Figure 6:
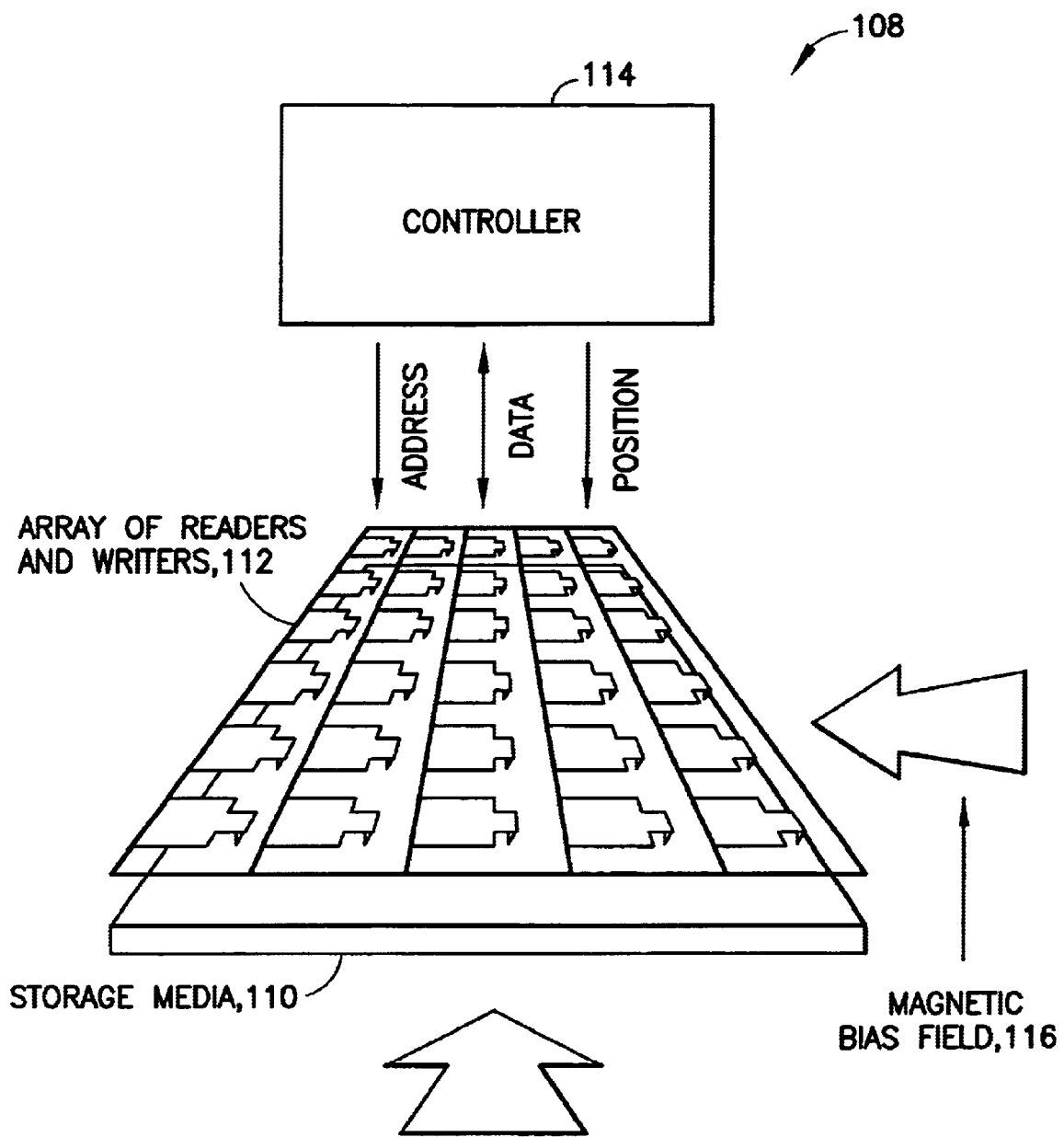
FIG. 6 shows an assembly in realization of principles of the present invention.

An overview of an illustrative such multi-stage assembly is shown in FIG. 6, numerals 108–116. Important features of the FIG. 6 multi-stage assembly 108 include the following:

1) A magnetic storage media (110) for recording, erasing, and writing magnetic bits. This media (110) may be separated in different storage fields, where each probe for read/write may access one of these fields.

2) The assembly (108) preferably comprises a parallel array (112) (N×M) preferably incorporating thermal near-field heaters (as writers), as well as, preferably, magnetic sensors (as readers), which can be moved en bloc as well as independently from each other.

3) The assembly (108) comprises a suitable controlling electronics (114) for coordinating a parallel or quasi-parallel reading/writing, as well as a positioning of each individual probe in the array. The electronics (114) allows one to address each probe individually, and to control the reading and writing.

4) The assembly (108) preferably uses a magnetic bias field (116) to assist the writing or maintaining the spins of the surrounding domains.

Storage Media

Specifically, the magnetic storage media (110) can be any kind, preferably a well-established longitudinal or vertical magnetic storage material. If a longitudinal magnetic media is used, preferably it is a very hard (high coercivity $H_c$>10 kGauss) material in order to form stable domains, because the stability of magnetic domains is improved with increasing coercivity. If a vertical media (e.g., Co/Pt multilayer) is used, the material can be generally softer and it still forms stable and small bits.

Array of Readers and Writers

Preferably, a parallel array of thermal heaters and magnetic sensors is used for the reading and writing. The properties of a suitable near-field heater are described above, which is capable of writing magnetic bits <500 A° via far-field and near-field coupling. Preferably, this heater is some form of an atomic force microscope probe, which can be heated resistively. The cantilever 15 acts as the heat sink while the tip is used for the thermal coupling. We note that for a standard AFM-probe the deposited heat diffuses in approximately 0.1 ms and may not be ideal for the application, where under certain circumstances higher speed is required. In this case, a special heater design may be advantageous as it is described above.

The magnetic sensor can be in general any kind of sensor, which is capable of detecting the magnetization pattern with high spatial resolution (<1000 A°). For example, preferably this is a magnetic force microscope probe, where the magnetic forces between a magnetic nanoscale probe and magnetic sample are measured. The probe material can be Ni or Fe. Often, Si-probes coated with a magnetic layer may be used as well. It is noted that the magnetic field of the magnetic probe has to be smaller than the field necessary to switch or influence the written domains. This means that the magnetic storage media (110) has to be harder than the probe material or field. Other examples for detecting the written magnetization pattern are magnetic tunneling, near-field optical Kerr, magnetic resistive sensing, or magnetic induction sensing. In this invention, the probe array can be moved en bloc, as well as every probe can be moved independently within the array. The movement of the single readers and writers as well as the total array can be easily achieved with integrated piezo electric positioning.

For the data storage device, it is very advantageous if the magnetic sensors and the heaters are the same, which requires a multifunctional probe. This may be realized in two ways: (1) The MFM-probe can be the thermal near-field heater as well. As an advantage of this strategy, it may be very simple. In addition, the local bias field from the MFM-probe can assist the writing process. However, as a disadvantage, it is noted that the heating of the probe has to be lower than the Curie-temperature of the probe material, which limits the heating range. (2) In a different strategy, it is proposed that a little nanoscale electromagnet may be used for heating (writing) as well as the MFM-readout. In such a case, the writing is done by a little current pulse, which heats the tip as well as generates a bias field. For subsequent reading, generally a reduced DC-current is applied.

In this invention, the read/write data speed of the single heater/magnetic sensor may not be critical, because the parallel or quasi-parallel operation of a total array of probes may be used to achieve high data rates. Since it is estimated that the readout via MFM may only be in the 10 kHz range, an array of 100×100 probes can achieve easily GHz data rates. We note that the array does not have to be symmetric, and that high and higher speeds can be obtained by implementing more readers and writers.

Controller

The x,y,z-position, the reading/writing and erasing of each probe (magnetic sensor+thermal heater) can be controlled independently and parallel or quasi-parallel by a multiplex controlling electronics (114). More specifically, and as it can be inferred from FIG. 7 (118), a clock preferably triggers a read or write process depending on the flag. In the case of reading, an individual reader within the array, which corresponds typically to one data block, is addressed via the address bus. This causes the addressed reader to move to the location of the assigned data within the data block. Before this particular reader has actually read his data point, the clock triggers another read event. A different reader is addressed in the array, it moves to the data point location within its data block and reads one data point. So the access time for reading data is given by the reading speed on an individual reader (roughly 0.1 ms). However, once the first reader has read its data, the next data comes with the rate of the clock triggering the reading events. It is noted that sequential data points have to be stored in different data blocks, which is read with different readers. In the case of the writing, the flag shows the writing signal. An individual writer is addressed, which moves to the location on the recording media, where the data is supposed to be stored. The thermal heater heats up the material with an extremely short pulse, a second slightly longer magnetic bias-field pulse helps writing the magnetic bit and the heat diffuses out into the substrate of the recording media. The substrate and recording media should have a high diffusivity (>10$^{-6}$ m$^2$/s) in order to dissipate the heat fast. Once this heat is dissipated and this particular data point has been written, a second writer, which already has moved to the right address and the right location, writes in similar manner the next data point. As in the case of the reading, the access time is given by the speed of an individual writer. However, the writing process is determined by the heat diffusion and thus by the clock. It is noted that as described above, the heat diffusion for small dimensions (as it is here the case) can be extremely fast (>100 MHz). It is noted that in particular applications, no magnetic bias field may be needed. However, in the cases where a magnetic field is needed, it can be global or local and in any direction as well as permanent.

Figure 7:
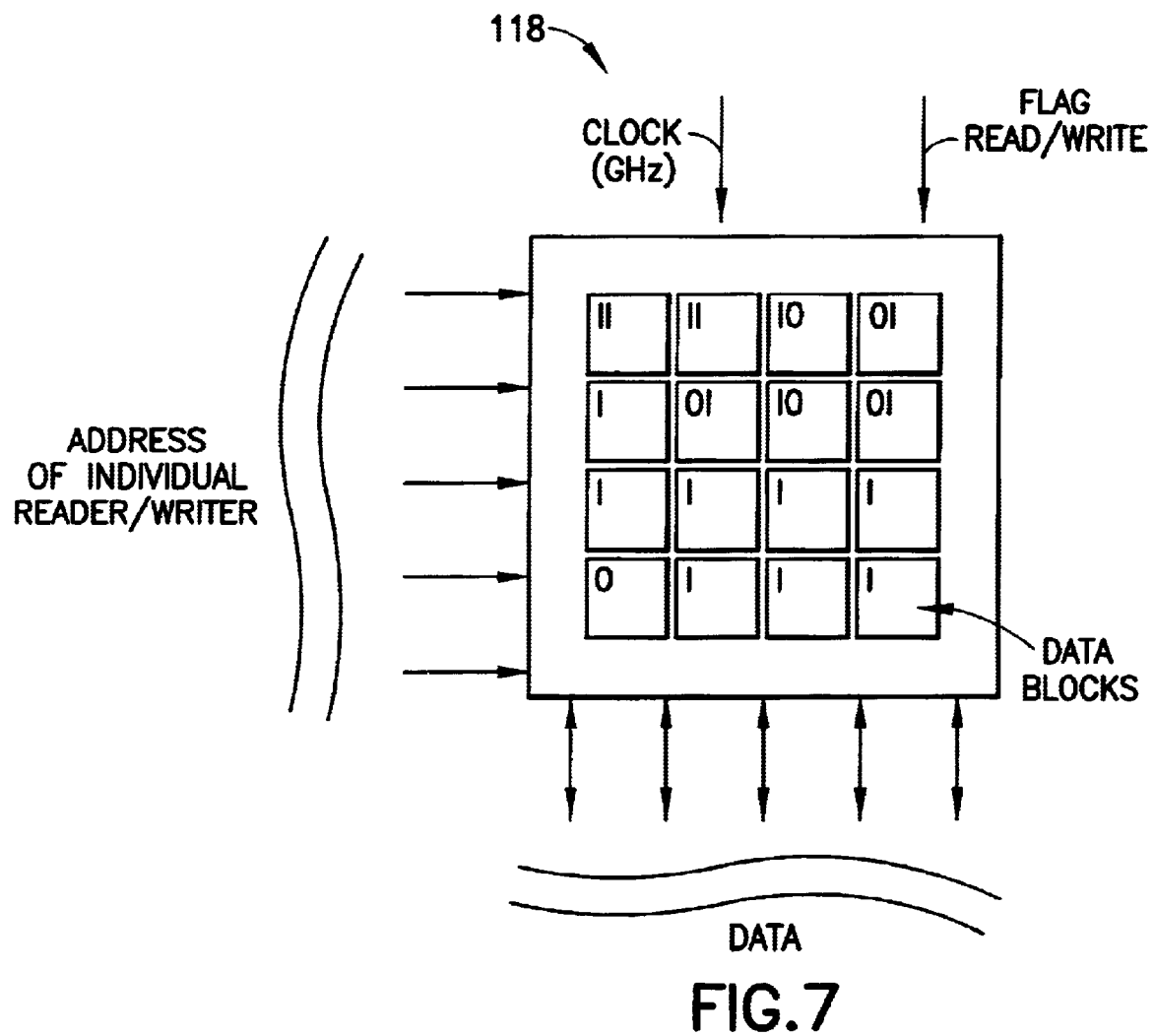
FIG. 7 shows aspects of a controller electronics used in the FIG. 6 assembly.

For a typical system, the whole storage device would be integrated in a single chip. The addressing of the data is probably done with a microprocessor, where the address tables may be stored on the same chip. In order to be more specific, for example, the information pattern 1110101011110111110111101 can be stored over 16 data blocks, as it is shown in FIG. 7. So, by the time the writer, which is responsible for the last data block, has finished to write his bit, the writer, which is responsible for the first data block, has to be ready to write the next data point next to its first.

Finally, an important additional aspect of this invention is mentioned. This technology can be nicely scaled up in a very recursive way. For example, if several probe arrays are implemented, which can be moved independently, then, from a different perspective, the several arrays can split the "work" in the same way the individual probes split their work in the different data blocks. In addition, we note that in the limit, where every probe interacts with its single data point location, a random access memory can be designed.

What is claimed:

1. An assembly for writing/reading high density data on a recording media comprising a magnetic information bit pattern, the assembly comprising:

1) a plurality of media probes wherein each probe is selected from the group consisting of a thermal heater for generating and directing an incident thermal wave to the media for enabling reading and/or writing, and, a magnetic sensor for enabling reading and/or writing;

2) a magnetic bias field generator for applying a magnetic bias field on the media;
3) a position controller for coordinating a mutual positioning of an enabled probe and the media for inducing a direct thermal coupling therebetween;
4) a control electronics for:
   (i) addressing a media probe for enabling and coordinating its reading and/or writing; and
   (ii) coordinating parallel or quasi-parallel reading and/or writing with an array of media probes by instruction to the position controller;
   the assembly acting as a writer by realizing at least one of the following actions per media probe:
      a) using an information signal for modulating the magnetic bias field;
      b) using an information signal for modulating the power of an incident thermal wave to the media;
   the assembly acting as a reader by operating the position controller vis a vis a preselected media probe.

2. An assembly according to claim 1, wherein the thermal heater comprises an atomic force microscope probe.

3. An assembly according to claim 1, wherein the thermal heater comprises a magnetic force microscope.

4. An assembly according to claim 1, wherein the thermal heater comprises:
1) a heating plate that can operate as a heat source; and
2) a heat sink attached to the heating plate;
   the thermal heater capable of developing a thermal coupling with the media, wherein at least one portion of the coupling is in a thermal near-field.

5. An assembly according to claim 1, wherein the magnetic sensor comprises magnetic-sensitive sensing.

6. An assembly according to claim 1, wherein the magnetic sensor comprises magnetic-force sensing.

7. An assembly according to claim 1, wherein the magnetic sensor comprises magnetic-tunneling junction sensing.

8. An assembly according to claim 1, wherein the magnetic sensor comprises near-field optical sensing.

9. An assembly according to claim 1, wherein the magnetic sensor comprises magnetic induction sensing.

10. An assembly according to claim 1, wherein the magnetic sensor comprises magnetic resistive sensing.

11. An assembly according to claim 1, wherein the magnetic sensor and the thermal heater both comprise the same element.

12. An assembly according to claim 11, wherein both elements comprise a magnetic force microscope.

13. An assembly according to claim 1, wherein the magnetic bias field generator comprises an electromagnet.

14. An assembly according to claim 1, wherein the magnetic bias field generator comprises a permanent magnet.

15. An assembly according to claim 1, wherein the magnetic bias field generator applies a local field.

16. An assembly according to claim 1, wherein the magnetic bias field generator applies a global field.

17. An assembly according to claim 1, wherein the magnetic bias field generator applies a pulsed field.

18. An assembly according to claim 1, wherein the position controller uses an actuator comprising a piezoelectric.

19. An assembly according to claim 1, wherein the position controller coordinates the mutual positioning of the incident thermal wave and the media so that they induce a coupling therebetween that subsumes at least one portion of a thermal near-field.

20. An assembly according to claim 1, wherein the position controller and control electronics cooperate so that a preselected set of at least two media probes are moved en bloc.

21. An assembly according to claim 1, wherein the position controller and control electronics cooperate so that a preselected set of at least two media probes are moved independently.

* * * * *